Feb. 16, 1971  S. W. NILSSON  3,563,107

NUT MECHANISM

Filed June 25, 1969

INVENTOR:
SVEN WALTER NILSSON

BY Howson & Howson

ATTYS.

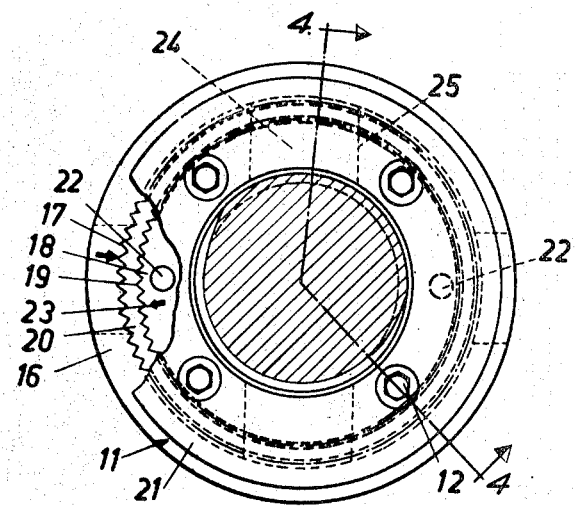
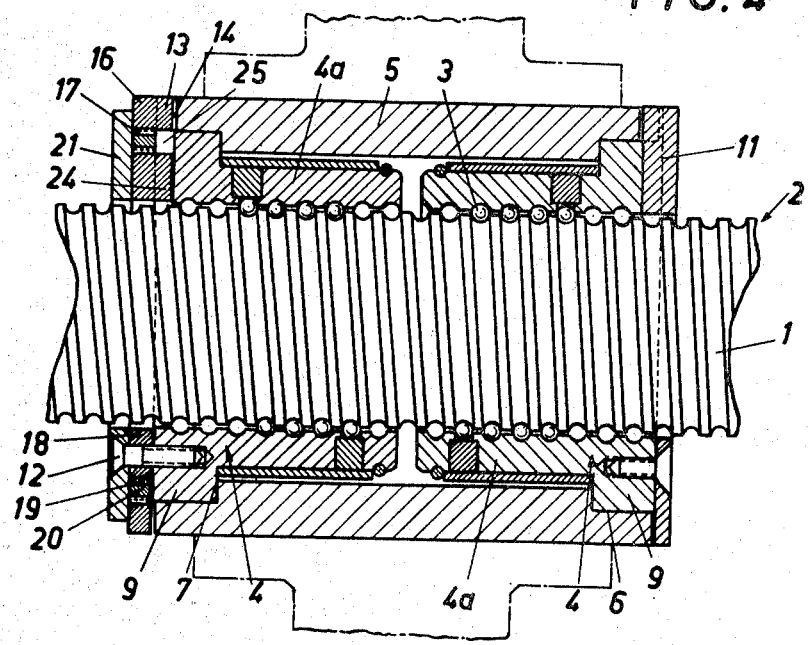

ns of the United States Patent Office 3,563,107
Patented Feb. 16, 1971

3,563,107
NUT MECHANISM
Sven Walter Nilsson, Savedalen, Sweden, assignor to Aktiebolaget Svenska Kullagerfabriken, Goteborg, Sweden, a corporation of Sweden
Filed June 25, 1969, Ser. No. 836,483
Claims priority, application Sweden, June 28, 1968, 8,839/68
Int. Cl. F16h 1/18, 55/04, 55/18
U.S. Cl. 74—441
9 Claims

ABSTRACT OF THE DISCLOSURE

The nut component of a ball nut mechanism is composed of two parts fitted together by an enclosing sleeve. Each nut part consists of a main body portion, in which the ball recirculation passage is located, and a radially directed end flange. This fits into a recess at the end of the sleeve, and the main portion of the sleeve defined between the two recesses has a larger internal diameter than the external diameter of the main portions of the nut parts in such a manner that the latter have no radial contact with the sleeve and thus are relieved of stresses and shock loads. Means are furthermore provided to adjust the clearance between the balls and the grooves in the sleeve and in the nut parts, respectively.

BACKGROUND OF THE INVENTION

The present invention refers to a ball nut mechanism of the type having two nut parts mounted on a screw, said nut parts being secured together by a common sleeve to a unit to which the member operated by the mechanism is to be fitted.

With earlier designs of mechanisms of this type, where two nut parts have been mounted in a common sleeve, the latter has been provided with an internal, centrally located shoulder against which the intermost ends of the nut parts are adapted to abut. The remote outwardly turned ends of the nut parts are provided with splines which mate with correspondingly shaped splines at the ends of the internal surface of the sleeve. In order to adjust the alignment of the balls between the nut and the screw, i.e. the axial and the radial clearance, it is necessary to remove the nut from the screw, whereafter the nut parts may be released from the fitting at the splines at the sleeve in such a manner that the nut part may be turned in relation to the sleeve. This procedure is tedious and complicated, and must often be repeated several times in order that the desired clearance shall be attained. Further disadvantages with this type of ball nut mechanism are that the external forces acting upon the sleeve have a tendency to interfere with the working of the nut parts in an unfavourable manner.

SUMMARY OF THE INVENTION

The aim of the present invention is on the one hand to propose an arrangement where the external force acting upon the sleeve to a limited degree only will be able to influence the working of the nut parts in relation to the screw, and furthermore to make possible adjustments of the ball clearance without the necessity of removing the nut part from the screw.

The invention is essentially characterized by that the outwardly directed ends of the nut parts are each provided with an external peripheral flange, and by the sleeve being provided with recesses mating with said flanges in the radial direction and defining between themselves a middle portion having a bigger diameter than the enclosed main bodies of the nut parts, each nut part having a ball recirculating passage located in its main body, inside the flange.

BRIEF DESCRIPTION OF THE DRAWINGS

FIG. 3 shows an elevation of a modified embodiment of the invention;
FIG. 4 is a section along line IV—IV in FIG. 3.

DESCRIPTION OF THE PREFERRED EMBODIMENTS

Figure 1:
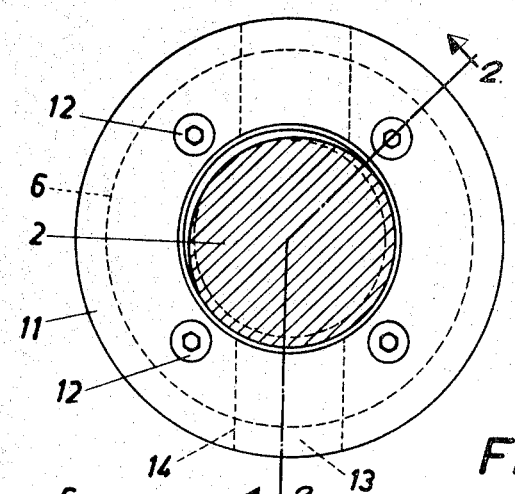
FIG. 1 shows an elevation of the ball nut mechanism.
Figure 2:
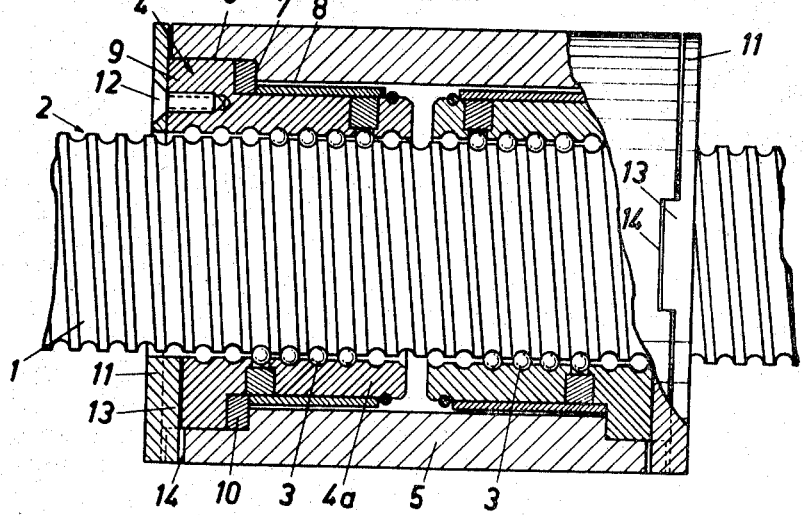
FIG. 2 is a section along line II—II in FIG. 1.

The ball nut mechanism shown in FIGS. 1 and 2 contains a shaft 2 having a helical groove 1 and which by way of a number of balls 3 cooperates with a nut unit composed of two nut parts 4. The recirculation of the balls 3 is arranged in a manner known per se, and forms by itself no part of this invention. It is therefore not explained in detail. The two nut parts 4 are enclosed by a common sleeve 5, the end portions of which are each provided with a recess 6 having a radially directed shoulder 7 forming the bottom thereof. Between said recesses a middle portion 8 extends, having a smaller diameter than the recessed portions.

Each nut part 4 is at its outwardly directed end provided with an external, peripheral flange 9, which closely fits into the recess in the sleeve, and the axial length of which is shorter than the recess 6. The main body 4a of the nut part 4, inside the flange 9, has a somewhat smaller diameter than the middle portion 8 of the sleeve. In the space between the flange 9 and the shoulder 7 of the recess an annular fitting piece 10 is mounted. To facilitate mounting this ring is divided in at least two arcuate portions. This fitting piece may by a simple grinding operation be given the exact thickness required to obtain the desired clearance between the balls and the ball race formed by the grooves in the screw and the nut parts 4. In order to guarantee that the mutual position of the sleeve 5 and each nut part 4, in the radial as well as in the axial direction, is maintained the outer end of each nut part is detachably fitted to a washer 11 by means of bolts 12. The washer is furthermore detachably fitted to the sleeve 5 by means of radially directed keys 13, which with a slight axial clearance cooperate with corresponding grooves 14 in the sleeve 5.

As is clearly shown in FIG. 2 the load is transferred from the sleeve to the nut parts by way of the flanges 9 only, both of which are located outside the recirculation passages for the balls 3. Corresponding parts are in the embodiment according to FIGS. 3 and 4 denoted by the same reference numerals. This embodiment is differentiated from that according to FIGS. 1 and 2 by the design of the adjusting means. This makes it possible to obtain a practically stepless adjustment (if desired each step may be chosen as small as one micron), and which may be brought about without any mechanical working of the parts. This means consists of an external ring 16 fitted to the sleeve 5, the internal peripheral rim of said ring being provided with teeth 17. The attachment of the ring is arranged in the same manner as shown in FIGS. 1 and 2 by means of radially arranged keys 13 at the inwardly directed surface of rings 16, said keys with a slight axial clearance cooperating with grooves 14 in the end surface of the sleeve 5. Inside this external ring an internal ring 18 is mounted, which likewise is provided with radially directed keys 24, which with a slight axial clearance cooperate with corresponding grooves 25 in the nut part 4 in such a manner that a rigid attachment is obtained. The external perimeter of the inner ring 18 is provided with teeth 19, and is that much smaller than the external ring 16 than an intermediate ring 20 may be fitted between the external and the internal ring. This intermediate ring is provided with external and internal teeth mating with those of the two first mentioned rings. The rings 16, 18 and 20 secured against axial displacement by means of a cover plate 21 mounted outside said rings and rigidly connected to the nut parts 4 by means of the screw 12. In order to facilitate the adjustment the internal toothed ring 18 is provided with two centering spigots 22 fitting into corresponding bores in the nut 4.

In order to reduce extraordinary loads, for instance radially directed chock loads on the sleeve, which may be transferred to the ball nut mechanism, and in order to obtain an overall flexibility of the power transfer between the sleeve and the nut parts by way of the adjustment rings 16, 18 and 20, the keys and grooves at the sleeve and the external rings are arranged in a plane, which is angularly displaced with respect to the plane of connection between the nut part and the internal ring, preferably by 90°.

The pitching of the teeth 17 and 19 is preferably equal in the three rings 16, 18 and 20, and as the circles of contact for these two teeth part are different, the teeth in one ring will not always be directly opposite teeth in the juxtaposed ring. By retaining the nut part 4 in relation to the screw 2 the exact position may be sought out, which provides the necessary adjustment. By chosing the diameters of the circles of contact in a suitable manner, as well as the pitch at the screw 2 it is possible to obtain a practically stepless adjustment.

The adjustment of the balls 3 in relation to the groove in the screw and in the nut parts 4, respectively, is obtained in the following manner.

Figure 5:
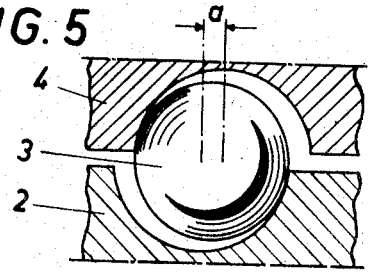
FIG. 5 shows on a larger scale a section through a portion of a ball race between the nut and the screw.

By releasing the screws 12 the cover plate 21 may be removed whereby rings 16, 18 and 20 will be available. Each ring 16 and 20, respectively, is preferably provided with an index mark 23 whereby the adjustment of the balls may be easily checked. The adjustment is brought about by removing the intermediate ring 20 and possibly also the external ring 16, whereupon a turning of the nut part 4 in relation to sleeve 5 and screw 2 is made. In the embodiment shown in FIG. 3 the related displacement corresponds to four teeth, whereby the measure denoted by *a* in FIG. 5, between the two grooves will be altered due to the inclination of the helical ball race in relation to the longitudinal axis of the screw 2. If the measure *a* is increased the clearance between the balls and the grooves will be increased, and when the measure *a* is decreased the clearance will be correspondingly increased.

Figure 6:
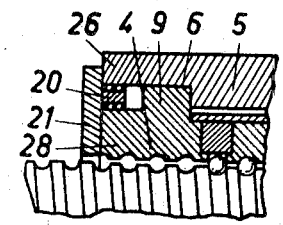
FIG. 6 shows a modified design of the locking means between a nut part and the sleeve.

FIG. 6 shows a modified embodiment in which the external ring 16 is designed as a projection 26, integral with the sleeve 5. The internal ring 18 is in the same manner substituted by a projection 28 integral with ball nut part 4. The two toothed projections cooperate with a locking ring 20 in the same manner as described in connection with FIG. 4.

What we claim is:

1. A ball nut mechanism of the type having a two-part nut working on a screw through the intermediation of a number of balls comprising:
   two nut parts, each having an outwardly directed peripheral flange and a main body provided with a ball recirculating passage;
   a sleeve enclosing said nut parts and at each end being provided with an internal recess mating with the flange of a nut part in the radial direction, said recesses defining between themselves a middle portion having a bigger internal diameter than the enclosed main portions of the nut parts; and
   means for retaining the nut parts in a fixed angular position in relation to the sleeve.

2. The ball nut mechanism as claimed in claim 1 in which a washer is detachably fitted to the outwardly directed end of each nut part as well as to the juxtaposed end portion of the sleeve.

3. The ball nut mechanism as claimed in claim 2 in which an annular fitting piece is located between the innermost surface of the flange at each nut part and the bottom of the surrounding recess.

4. The ball nut mechanism as claimed in claim 3 in which the fitting piece is divided in at least two arcuate portions.

5. The ball nut mechanism as claimed in claim 1 in which an internal rim portion of each sleeve end is toothed, and in which an external rim portion of each nut part is likewise toothed, said toothed rim portions being radially spaced to permit the fitting of an intermediate ring having external as well as internal toothed rim portions, and in which means are provided to retain the toothed rim portions in engaging axial position.

6. The ball nut mechanism as claimed in claim 5, in which the internal toothed rim portions at the ends of the sleeve are provided at separate ring elements, detachably mounted on the sleeve.

7. The ball nut mechanism as claimed in claim 5 in which the external rim portion at each nut part is provided at a separate ring element, detachably mounted on the nut part.

8. The ball nut mechanism as claimed in claim 5, in which the means for fitting the external ring to the sleeve and the internal ring to the nut part, respectively, includes keys at the pertaining ring designed with a limited axial clearance to cooperate with grooves in the sleeve and in the nut part, respectively.

9. The ball nut mechanism as claimed in claim 8, in which the keys at the external ring and the grooves in the sleeve are angularly displaced (preferably by 90°) in relation to the keys of the internal ring and the grooves at the nut part.

References Cited

UNITED STATES PATENTS

| 2,933,941 | 4/1960 | Millns | 74—441 |
| 2,959,976 | 11/1960 | Zrankl | 74—441 |
| 3,141,349 | 7/1964 | McDonald | 74—441 |
| 3,355,959 | 12/1967 | Whicker | 74—424.8 |

LEONARD H. GERIN, Primary Examiner

U.S. Cl. X.R.

74—424.8, 459